US012047520B2

(12) United States Patent
Nowotny

(10) Patent No.: US 12,047,520 B2
(45) Date of Patent: Jul. 23, 2024

(54) SYSTEMS AND METHODS FOR PROVIDING A DECENTRALIZED PROCESSING NETWORK

(71) Applicant: Krypton Labs, Inc., Los Angeles, CA (US)

(72) Inventor: Michael Christoph Nowotny, Los Angeles, CA (US)

(73) Assignee: KRYPTON LABS, INC., Los Angeles, CA (US)

( * ) Notice: Subject to any disclaimer, the term of this patent is extended or adjusted under 35 U.S.C. 154(b) by 0 days.

(21) Appl. No.: 18/534,466

(22) Filed: Dec. 8, 2023

(65) Prior Publication Data

US 2024/0195642 A1 Jun. 13, 2024

Related U.S. Application Data

(60) Provisional application No. 63/431,179, filed on Dec. 8, 2022.

(51) Int. Cl.
*H04L 29/06* (2006.01)
*H04L 9/00* (2022.01)
*H04L 9/32* (2006.01)

(52) U.S. Cl.
CPC .............. *H04L 9/50* (2022.05); *H04L 9/3236* (2013.01)

(58) Field of Classification Search
CPC ................................ H04L 9/50; H04L 9/3236
See application file for complete search history.

(56) References Cited

U.S. PATENT DOCUMENTS

| 11,196,542 | B2* | 12/2021 | Natarajan | ............. | H04L 9/3239 |
| 11,924,323 | B2* | 3/2024 | Vouk | ..................... | H04L 9/0637 |
| 2018/0343110 | A1 | 11/2018 | Funk | | |
| 2020/0007313 | A1* | 1/2020 | Vouk | ....................... | H04L 63/12 |
| 2020/0007314 | A1* | 1/2020 | Vouk | ..................... | H04L 9/0643 |
| 2020/0073758 | A1* | 3/2020 | Natarajan | ........... | G06F 11/1474 |
| 2020/0073962 | A1* | 3/2020 | Natarajan | ............. | H04L 9/0643 |
| 2020/0076571 | A1* | 3/2020 | Natarajan | ................ | H04L 9/50 |

(Continued)

OTHER PUBLICATIONS

Albert S. Kyle and Jeongmin Lee, Toward a fully continuous exchange, Oxford Review of Economic Policy, vol. 33, No. 4, 2017, pp. 650-675.

*Primary Examiner* — Mahfuzur Rahman
(74) *Attorney, Agent, or Firm* — Bryan L. Baysinger; Maynard Nexsen PC

(57) ABSTRACT

The decentralized processing system can identify zero or more cryptographic commitments to update a state of the blockchain recorded on the blockchain. The system can receive an indication to update the state of the blockchain. In response, the system can transmit to a decentralized consensus network (DCN) instructions for the DCN to compute a subsequent state. The system can receive, from the DCN, a first cryptographic hash associated with a data structure which is determined based on the computed subsequent state. The system can receive, form an implementation keeper a series of data entries associated with the data structure. A second cryptographic hash can be computed for each of the series of data entries and the system can determine whether each second cryptographic hash matches the first cryptographic hash. The system can execute instructions contained within each of the series of data entries to evolve the state of the blockchain.

20 Claims, 7 Drawing Sheets

(56) References Cited

U.S. PATENT DOCUMENTS

| | | |
|---|---|---|
| 2020/0195441 A1* | 6/2020 | Suen .................. G06F 16/1805 |
| 2021/0067321 A1 | 3/2021 | Lu |
| 2022/0173888 A1 | 6/2022 | Shi et al. |
| 2022/0353086 A1 | 11/2022 | Roling et al. |

* cited by examiner

SYSTEMS AND METHODS FOR PROVIDING A DECENTRALIZED PROCESSING NETWORK

CROSS-REFERENCE TO RELATED APPLICATION

This application claims the benefit of U.S. Provisional Patent Application No. 63/431,179, filed Dec. 8, 2022, which is incorporated by reference herein in its entirety.

FIELD

The disclosed technology relates to systems and methods for providing a decentralized consensus network. Specifically, this disclosed technology relates to a blockchain-enabled, decentralized computing system that is configured to enable highly complex on-chain computation by moving storage and computation off-chain.

BACKGROUND

The advent of blockchain technology has the capacity to revolutionize many fields, including finance, supply chain management, gaming, voting and governance, and more. Some existing blockchain platforms provide the capacity to perform computations over a "distributed computer" by leveraging nodes of a blockchain that come to consensus to determine a future state of the system. For example, Ethereum is also colloquially known as a "distributed virtual machine" and can provide smart contract computational functionality as well as enabling the exchange of cryptocurrency tokens.

However, "distributed computers," such as those enabled by the Ethereum ecosystem, face several drawbacks that limit their ability to provide distributed computational power. For example, these distributed computers are limited in at least two major areas—how much data can be stored on the blockchain as well and the complexity of computations that are capable of being performed on-chain. Some solutions have been proposed that aim to alleviate some of these issues. For example, methods such as optimistic rollups and zero knowledge (ZK) rollups are able to reduce the cost of calculations for computations that are of a similar order of complexity as what is already possible using conventional blockchain systems. ZK rollups achieve improvements by moving some of the computation off-chain. Optimistic rollups achieve improvements by moving some computation and state storage off-chain. However, both ZK rollups and optimistic rollups face significant disadvantages that limit their usefulness for enabling complex computation on a distributed computer. For example, optimistic rollups require a lengthy lock-up period to permit users to challenge a fraudulent state change. ZK rollups require the creation of a cryptographic proof of correctness whose computational complexity significantly exceeds that of the actual computational workload, making proving times so long that ZK rollups become impractical for complex workloads. Additionally, conventional improvements to distributed computers also face difficulty in solving the data storage and computational limits while preserving the security offered by on-chain processing.

Accordingly, there is a need for improved systems and methods for providing a decentralized processing network. Embodiments of the present disclosure are directed to these and other considerations.

SUMMARY

In some aspects, the techniques described herein relate to a decentralized processing network including: a decentralized processing system configured to: receive, from one or more user devices, zero or more cryptographic commitments to evolve a state of a decentralized blockchain network from a previous state to a subsequent state; record each of one or more commitments in one or more blocks of the decentralized blockchain network; receive, from an initiation keeper an indication that the recorded one or more blocks exceed a threshold number of blocks; in response to the indication, transmit, to a decentralized consensus network remote from the decentralized blockchain network, instructions for the decentralized consensus network to compute the subsequent state of the decentralized blockchain network based on (i) the previous state of the decentralized blockchain network and (ii) the one or more commitments recorded as the one or more blocks of the decentralized blockchain network; receive a first Merkle tree root hash from the decentralized consensus network; receive a series of Merkle tree leaves associated with a Merkle tree and a plurality of hashes corresponding to complementary branches of the Merkle tree associated with a root to leaf path for each of the series of Merkle tree leaves from an implementation keeper; compute, for each of the series of Merkle tree leaves using the plurality of hashes, a second Merkle tree root hash; for each of the series of Merkle tree leaves, using the plurality of hashes, determine that the second Merkle tree root hash matches the first Merkle tree root hash; and execute instructions contained within each of the Merkle tree leaves to evolve the state of the decentralized blockchain network from the previous state to the subsequent state; the initiation keeper configured to: monitor the decentralized processing system; and detect when the recorded one or more blocks of blockchain exceed a threshold number of blocks; the decentralized consensus network configured to: compute a subsequent state of the decentralized blockchain network based on (i) the previous state and (ii) the one or more commitments recorded as the one or more blocks of the decentralized blockchain network; record a state file associated with the subsequent state to a remote storage platform; compute the Merkle tree associated with the subsequent state; determine the first Merkle tree root hash associated with the Merkle tree; and transmit the first Merkle tree root hash to the decentralized blockchain network; a remote storage platform configured to: receive, from the decentralized consensus network, the state file; and store the state file; an implementation keeper configured to: compute the Merkle tree based on the state file and the zero or more cryptographic commitments; and transmit, to the decentralized blockchain network, a series of Merkle tree leaves associated with the Merkle tree and the plurality of hashes of the Merkle tree.

In some aspects, the techniques described herein relate to a decentralized processing system including: one or more processors; one or more non-transitory memories in communication with the one or more processors storing instructions thereon that when executed by the one or more processors are configured to cause the decentralized processing system to: identify zero or more cryptographic commitments to evolve a state of a blockchain from a previous state to a subsequent state recorded in one or more blocks of the blockchain; receive an indication to update the state of the blockchain from the previous state to the subsequent state; in response to the indication, transmit, to a decentralized consensus network remote from the decentralized processing system, instructions for the decentralized consensus network to compute a subsequent state based on (i) the previous state and (ii) commitments recorded in one or more blocks of the blockchain; receive, from the decentralized consensus network, a first cryptographic hash associated with a data structure, the first cryptographic hash determined by the decentralized consensus network based on the computed subsequent state; receive, from an implementation keeper a series of data entries associated with the data structure and one or more complementary hashes for each data entry of the series of data entries; compute, for each of the series of data entries, a second cryptographic hash; for each of the series of data entries, determine that the second cryptographic hash matches the first cryptographic hash; and execute instructions contained within the series of data entries to evolve the state of the blockchain from the previous state to the subsequent state.

In some aspects, the techniques described herein relate to a decentralized processing system, wherein: the data structure includes a Merkle tree; the first cryptographic hash includes a first Merkle tree root hash; each of the computed second cryptographic hashes include a second Merkle tree root hash; the series of data entries include a series of Merkle tree leaves associated with the Merkle tree; and the one or more complementary hashes for each data entry of the series of data entries include one or more complementary hashes of the Merkle tree for each Merkle tree leaf of the series of Merkle tree leaves.

In some aspects, the techniques described herein relate to a decentralized processing system, wherein the one or more non-transitory memories store further instructions, that when executed by the one or more processors, are configured to cause the system to: determine whether the first cryptographic hash has previously been implemented to evolve the state of the blockchain; in response to the first cryptographic hash having previously been implemented, do not evolve the previous state to the subsequent state.

In some aspects, the techniques described herein relate to a decentralized processing system, wherein the one or more non-transitory memories store further instructions, that when executed by the one or more processors, are configured to cause the system to: determine, for each data entry of the series of data entries, whether a respective data entry has previously been implemented to evolve the state of the blockchain; reject the respective data entry responsive to determining that a respective Merkle tree leaf has been previously implemented.

In some aspects, the techniques described herein relate to a decentralized processing system, wherein the data structure is selected from a Merkle tree, a Verkle tree, a Patricia Trie, and a Merkle Patricia Trie.

In some aspects, the techniques described herein relate to a decentralized processing system, wherein the non-transitory memory includes further instructions, that when executed by the one or more processors, are configured to cause the system to store a cryptographic hash associated with program instructions executed by the decentralized consensus network.

In some aspects, the techniques described herein relate to a decentralized processing system, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

In some aspects, the techniques described herein relate to a decentralized processing system, wherein the decentralized consensus network includes the implementation keeper.

In some aspects, the techniques described herein relate to a decentralized processing system, wherein the series of Merkle tree leaves include data for work units to be carried out by the decentralized processing system to evolve the previous state to the subsequent state.

In some aspects, the techniques described herein relate to a decentralized processing system, wherein at least one Merkle tree leaf of the series of Merkle tree leaves includes a cryptographic hash associated with the subsequent state.

In some aspects, the techniques described herein relate to a decentralized processing system, wherein one or more Merkle tree leaves of the series of Merkle tree leaves include instructions to evolve the state of the blockchain from the previous state to the subsequent state.

In some aspects, the techniques described herein relate to a decentralized processing system, wherein the indication includes the recorded one or more blocks exceeding a threshold number of blocks.

In some aspects, the techniques described herein relate to a decentralized processing system, wherein the indication includes a timestamp associated with the recorded one or more blocks exceeding a threshold value.

In some aspects, the techniques described herein relate to a decentralized processing system including: one or more processors; one or more non-transitory memories in communication with the one or more processors storing instructions thereon that when executed by the one or more processors are configured to cause the system to: identify zero or more cryptographic commitments to evolve a state of a blockchain from a previous state to a subsequent state recorded in one or more blocks of the blockchain; receive an indication to update the state of the blockchain from the previous state to the subsequent state; in response to the indication, transmit, to a decentralized consensus network remote from the decentralized processing system, instructions for the decentralized consensus network to compute the subsequent state based on (i) the previous state and (ii) commitments recorded in one or more blocks of the blockchain; receive, from the decentralized consensus network, a first Merkle tree root hash associated with a Merkle tree, the first Merkle tree root hash determined by the decentralized consensus network based on the computed subsequent state; receive, from an implementation keeper a series of Merkle tree leaves associated with the Merkle tree and a plurality of hashes corresponding to complementary branches of the Merkle tree associated with a root to leaf path for each of the series of Merkle tree leaves from an implementation keeper; compute, for each of the series of Merkle tree leaves using the plurality of hashes, a second Merkle tree root hash; for each of the series of Merkle tree leaves, using the plurality of hashes, determine that the second Merkle tree root hash matches the first Merkle tree root hash; and execute instructions contained within each of the Merkle tree leaves to evolve the state of the blockchain from the previous state to the subsequent state.

In some aspects, the techniques described herein relate to a decentralized processing system, wherein the one or more non-transitory memories store further instructions, that when executed by the one or more processors, are configured to cause the system to: determine whether the first Merkle tree root hash has previously been implemented to evolve the state of the blockchain; in response to the first Merkle tree root hash having previously been implemented, do not evolve the previous state to the subsequent state.

In some aspects, the techniques described herein relate to a decentralized processing system, wherein the one or more non-transitory memories store further instructions, that when executed by the one or more processors, are configured to cause the system to: determine, for each of the series of Merkle tree leaves, whether a respective Merkle tree leaf has previously been implemented to evolve the state of the blockchain; reject the respective Merkle tree leaf responsive to determining that the respective Merkle tree leaf has been previously implemented.

In some aspects, the techniques described herein relate to a decentralized processing system, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

In some aspects, the techniques described herein relate to a decentralized processing system, wherein the indication is selected from the recorded one or more blocks exceeding a threshold number of blocks and a timestamp associated with the recorded one or more blocks exceeding a threshold value.

In some aspects, the techniques described herein relate to a decentralized processing system, wherein the plurality of hashes correspond to complementary branches of the Merkle tree associated with a root to leaf path for each of the series of Merkle tree leaves.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
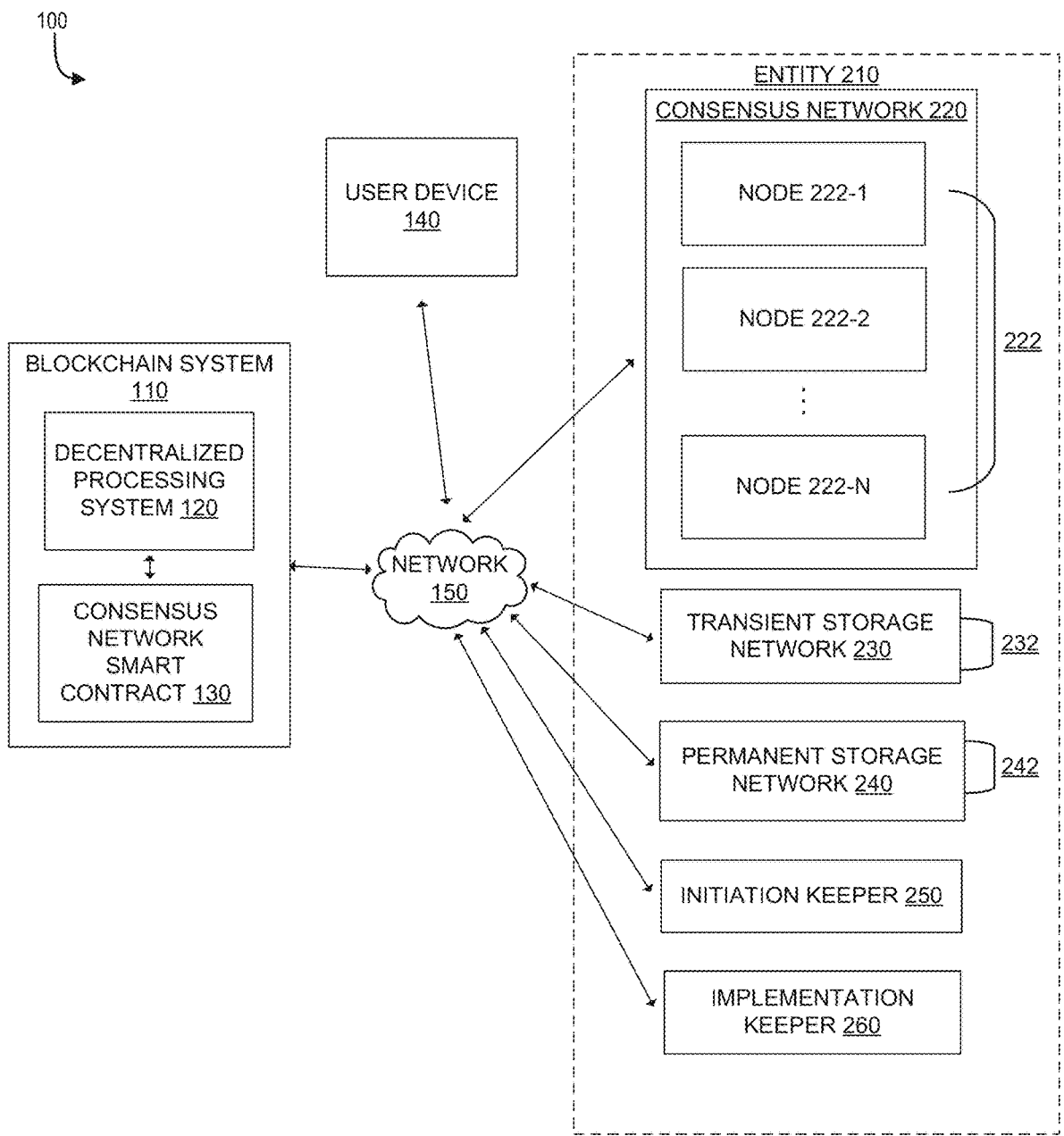
FIG. 1 is a block diagram of an example system that may be used to provide a decentralized processing network, according to an example implementation of the disclosed technology.

Examples of the present disclosure related to systems and methods for providing a decentralized processing network. More particularly, the disclosed technology relates to systems and methods that allow computations of higher complexity to be performed on a blockchain enabled distributed computer network by offloading state storage and computational power to be performed off chain without sacrificing cryptographic security. The systems and methods described herein improve, in some instances, the operation of computers and technology. The present disclosure details how the disclosed systems and methods are capable of allowing highly complex computations to occur on a blockchain enabled distributed computer network by reducing both on-chain storage and computational requirements without reducing the cryptographic security offered by on-chain processing. This, in some examples, may involve using a consensus network to dynamically calculate state changes of the blockchain off-chain and an off-chain storage network to store state changes, which allows highly complex operations to be performed over a distributed computational network which are not possible using conventional methods. This is a clear advantage and improvement over prior technologies that are limited in computational capabilities because of on-chain storage and computational limitations. The present disclosure solves this problem by moving certain computations off-chain and storing the state of the blockchain off-chain without sacrificing cryptographic security. Furthermore, examples of the present disclosure may also improve the speed with which a distributed computers can perform complex calculations. Overall, the systems and methods disclosed have significant practical applications in the decentralized processing field because of the noteworthy improvements to distributed computing, which are important to solving present problems with this technology.

At a high level, the disclosed systems and methods provide for a blockchain-enabled decentralized processing system that is capable of complex computations that cannot be performed on a traditional distributed system due to storage and computation constraints. In some aspects, the system can include a blockchain system comprising a plurality of nodes that are running blockchain system software. The blockchain system includes the decentralized processing system, which is implemented as a smart contract operating on the blockchain system. The blockchain system also includes a consensus network smart contract operatively connected to a distributed consensus network that is remote from the blockchain system and that enables communication of data between the decentralized processing system and the distributed consensus network. In some embodiments, the distributed consensus network is a separate blockchain-enabled system that is utilized by the decentralized processing system for coming to consensus about state changes of the blockchain system. Users can submit cryptographic commitments to the decentralized processing system which are recorded to the blockchain system via the decentralized processing system. However, in order to save computational power, resultant state changes caused by those cryptographic commitments are computed off chain as described below.

In some embodiments, the system includes a form of distributed storage that is separate from the blockchain system, which may be a permanent storage system, a transient storage system, or a combination of permanent storage and transient storage. The storage system can also be implemented as a distributed system operating on a plurality of nodes similar to the blockchain system and the consensus network. Finally, in some embodiments, the system can include an initiation keeper and an implementation keeper, although it should be understood that a single entity/network could optionally control one or more of the consensus network, transient storage network, permanent storage network, initiation keeper, and implementation keeper.

At a high level, the decentralized processing system is configured to enable complex computations on the blockchain system that evolve the state of the blockchain from a state at time $t_n$ to a future state a time $t_{n+1}$. Cryptographic commitments are written to the blockchain system via the decentralized processing system, the cryptographic commitments associated with changes to the state of the blockchain system. The consensus network smart contract receives data from the decentralized processing system associated with the cryptographic commitments that describe the functions that need to be executed to evolve the state of the blockchain system. Instead of executing the computation of the state resulting from these cryptographic commitments and storing the resulting state on the blockchain system for each and every transaction, the computations are deferred until a given threshold of cryptographic commitments are reached. In certain embodiments, the initiation keeper verifies whether the threshold has been reached and notifies the decentralized processing system that the threshold has been reached, but in other embodiments, the decentralized processing system may be capable of determining whether the threshold is reached internally. The threshold can be of any type. For example, the threshold can be a threshold number of cryptographic commitments (e.g., the blockchain reaching an appropriate "block height" threshold). In other embodiments, the threshold can be associated with reaching an appropriate time threshold (e.g., recording a cryptographic commitment in a block associated with an appropriate time stamp threshold). In any case, once the threshold is reached, all of the cryptographic commitments since the previous update period and until the end of the next update period are processed in sequence by the consensus network, which comes to consensus about the appropriate state change from time $t_n$ to time $t_{n+1}$. The nodes operating the consensus network can be configured to retrieve verified software for performing the operations necessary to determine the state change as if being performed on-chain by the decentralized processing system, for example, by retrieving a copy of the software stored on a permanent storage network, based on a unique identifier that can be obtained from the decentralized processing system. In some embodiments, this unique identifier can be a cryptographically secure hash that uniquely identifies the software file stored on the permanent storage network. The consensus network can save the resultant state to a storage network (e.g., either a transient storage network or a permanent storage network), and can transmit a cryptographically secure content identifier of the stored state back to the decentralized processing system. Separately, in certain embodiments, the implementation keeper can access the state file stored by the consensus network on the storage network, and can recompute the computations necessary to evolve the state of the blockchain. The implementation keeper may then send instructions to the decentralized processing system to evolve the state of the blockchain from the state at time $t_n$ to the state at time $t_{n+1}$. The decentralized processing system verifies that the instructions are correct and have not already been implemented on the blockchain, and after verification, evolves the state from the state at time $t_n$ to the state at time $t_{n+1}$.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example decentralized processing network 100, according to an example implementation of the disclosed technology. The components and arrangements shown in FIG. 1 are not intended to limit the disclosed embodiments as the components used to implement the disclosed processes and features may vary. As shown, decentralized processing network 100 may include a blockchain system 110 that operates on a number of nodes 310-1, 310-2, . . . , 320-N (discussed in more detail with respect to FIG. 2), a user device 140, a consensus network 220, a transient storage network 230, a permanent storage network 240, an initiation keeper 250, and an implementation keeper 260 connected by network 150. In certain example implementations, an entity 210 can control one or more of the consensus network 220, a transient storage network 230, a permanent storage network 240, an initiation keeper 250, and an implementation keeper 260. In certain example implementations, blockchain system 110 can include a decentralized processing system 120 and a consensus network smart contract 130. In certain example implementations, the consensus network can include a plurality of nodes 222-1, 222-2, . . . , 222-N that in combination comprise the consensus network 220. Although not shown in FIG. 1, in some embodiments, one or more of transient storage network 230 and permanent storage network 240 may be implemented by a plurality of nodes similar to those described with respect to nodes 222 and nodes 310. For example, in certain embodiments, transient storage network 230 is enabled by distributed nodes 232 (e.g., 232-1, 232-2, . . . , 232-N) and permanent storage network 240 is enabled by distributed nodes 242 (e.g., 242-1, 242-2, . . . , 242-N).

In some embodiments, a user may operate the user device 140. The user device 140 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 150 and ultimately communicating with one or more components of the decentralized processing network 100. Although only one user device 140 is shown within decentralized processing network 100, it should be understood that there may be any number of user devices 140 (e.g., user device 140-1, 140-2, . . . , 140-N) within system 100. In practice, user devices 140 can be configured to communicate with blockchain system 110 in order to make cryptographic commitments to decentralized processing system 120. Cryptographic commitments, in its most general sense, are instructions associated with the decentralized processing system 120 and recorded on the blockchain system 110 that evolve the state of blockchain system 110 over time from a state at time $t_n$ to a new state associated with time $t_{n+1}$. As will be described in more detail below, the cryptographic commitments written to blockchain system 110 can be used an input by components of decentralized processing network 100 to encode an output of units of work that are configured to evolve the state of blockchain system 110 from the state associated with time $t_n$ (referred to herein as a "previous" state) to the new state associated with time $t_{n+1}$ (referred to herein as a "subsequent" state). In certain example embodiments, the cryptographic commitments made by users can be associated with instructions for buying, selling, or trading cryptocurrency tokens, and the units of work are the transfers made among users of user devices 140 (e.g., user device 140-1, 140-2, . . . , 140-N) operating within decentralized processing network 100. More generally, cryptographic commitments are not limited to instructions for the exchange of tokens, and can represent inputs to an algorithm or computer program associated with the decentralized processing system 120 that causes decentralized processing system 120 to engage in computations of any type. The resultant output units of work are the steps the decentralized processing system 120 takes in order to evolve the state of the blockchain 110 from the previous state to the subsequent state. Blockchain 110 can be of any type, for example a public blockchain, a private blockchain, a semi-private blockchain etc. In certain embodiments, blockchain 110 includes smart contract functionality that enables the operation of decentralized processing system 120 and consensus network smart contract 130. In certain non-limiting embodiments, the blockchain 110 may comprise the Ethereum blockchain.

Users may include individuals such as, for example, subscribers, clients, prospective clients, or customers of decentralized processing system 120. According to some embodiments, the user device 140 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 150 may be of any suitable type, including individual connections via the internet such as cellular or WiFi networks. In some embodiments, the network 150 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 150 may include any type of computer networking arrangement used to exchange data. For example, the network 150 may be the Internet, a private data network, virtual private network (VPN) using a public network, and/or other suitable connection(s) that enable(s) components in the decentralized processing network 100 to send and receive information. The network 150 may also include a PSTN and/or a wireless network.

The entity 210 may be associated with and optionally controlled by one or more entities such as a business, corporation, individual, partnership, or any other entity that provides one or more services to individuals such as customers associated with consensus network 220, transient storage network 230, permanent storage network 240, the initiation keeper 250, and the implementation keeper 260. In some embodiments, the entity 210 may be controlled by a third party on behalf of another business, corporation, individual, partnership. The entity 210 may include one or more servers and computer systems for performing one or more functions associated with products and/or services that consensus network 220, transient storage network 230, permanent storage network 240, the initiation keeper 250, and the implementation keeper 260 provides.

The decentralized processing system 120 can be implemented as a smart contract that operates on blockchain system 110. Upon receiving cryptographic commitments, the decentralized processing system 120 defers computation of the subsequent state (e.g., the state associated with $t_{n+1}$) until a certain threshold is reached. Upon reaching the threshold, (e.g., a block height or timestamp associated threshold) the decentralized processing system 120 can be configured to call the consensus network smart contract 130 to cause the consensus network smart contract 130 to emit an "event" that is monitored by nodes 222 of the consensus network 220. The event then may cause the nodes 222 of consensus network 220 to retrieve the instructions associated with the cryptographic commitments from blockchain system 110 to begin computing the state change from the previous state to the subsequent state. Nodes 222 of consensus network 220 may also come to consensus on the state change from the previous state to the subsequent state. According to some embodiments, the events can be implemented through a blockchain enabled service, for example by using a service like Infura.

In an alternative embodiment, the consensus network 220 may directly monitor the blockchain system 110 to determine when a threshold has been reached (e.g., a threshold number of cryptographic commitments have been recorded in one or more blocks of blockchain system 110, or a threshold amount of time has passed since the previous state evolution of the blockchain) to determine when to retrieve the instructions associated with the cryptographic commitments from blockchain system 110 and begin computing the state change from the previous state to the subsequent state. In another embodiment, the decentralized processing system 120 can be configured to update a smart contract variable that can be monitored by the nodes 222 of consensus network 220 to indicate when the state change computation should be initiated. In yet another embodiment, the decentralized processing can make a function call to the consensus network smart contract 130 to update a smart contract variable that can be monitored by nodes of consensus network 220 to a smart contract variable that can be monitored by the nodes 222 of consensus network 220 to indicate when the state change computation should be initiated.

The consensus network smart contract 130 is a smart contract associated with consensus network 220 that is configured to allow data to be shared between decentralized processing system 120 and consensus network 220. In certain example embodiments, the consensus network smart contract 130 is configured to emit an "event" to allow the nodes 222 of consensus network 220 to determine when the state update threshold is reached (e.g., when to begin computing the state change from the previous state to the subsequent state). The event includes information associated with the deferred cryptographic commitments made to the blockchain system since the previously determined threshold. This information is relayed to the consensus network 220. The consensus network 220 computes the state change based on the previous state and the deferred cryptographic commitments. The consensus network is able to run a copy of the same protocol operating on the decentralized processing system 110 by accessing a copy of the software stored on a permanent storage network, which allows the consensus network to perform the operations necessary to determine the state change as if being performed on-chain by the decentralized processing system. The consensus network 220 may identify the previous state of the decentralized processing network 110 by requesting a content identifier associated with the previous state file that may be stored on the transient storage network 230. It should be understood however, that the state file may alternatively be stored on permanent storage network 240. In some embodiments, the consensus network 220 may recompute the previous state of blockchain system 110 without referring to a state file by using data recorded on the blockchain system 110. Based on the previous state and the deferred cryptographic commitments, the consensus network 220 can determine the subsequent state.

Consensus regarding the subsequent state can be achieved in a number of ways. In certain embodiments, the consensus network can come to consensus regarding the state change from the previous state to the subsequent state. For example, one or more nodes 222 of the nodes operating the consensus network 220 can independently compute the subsequent state based on the previous state and deferred cryptographic commitments, and the subsequent state determined by a plurality or majority of nodes 222 is determined to be the correct subsequent state. In another embodiment, each of the participating nodes 222 transmits data indicating its calculated subsequent state to the consensus network smart contract 130, and consensus of the correct subsequent state can occur on the consensus network smart contract 130. In yet another embodiment, each node 222 that participates in the calculation of the subsequent state can relay data indicative of the subsequent state to the decentralized processing system 130, and decentralized processing system 130 may determine the true subsequent state by identifying the subsequent state that a plurality or majority of nodes 222 determined. In certain non-limiting embodiments, the consensus network 220 can comprise a decentralized oracle network. In certain non-limiting embodiments, the consensus network 220 can comprise the Chainlink platform. Most components within the blockchain processing network operate in a trustless fashion, because their actions can be cryptographically verified by the decentralized processing system 120. In contrast, in some embodiments, the consensus network 220 may be a "trusted" entity. However, truthfulness of the consensus network can be enforced in a variety of ways. For example, in certain embodiments operators of the consensus network 220 may be contractually obligated to perform computations truthfully. In certain embodiments, consensus network may be economically incentivized through a tokenization payment scheme to act truthfully by depositing cryptocurrency tokens that may be lost if truthfulness of the consensus network 220 is not enforced. Various other truthfulness mechanisms may be deployed to guarantee the truthfulness of consensus network 220, such as proof of stake, proof of authority, and/or via contractual obligations and the legal system if consensus network 220 is operated by a permissioned identifiable actor(s), such as entity 210.

The consensus network 220 can be configured to relay data necessary for the decentralized processing system 120 to evolve the state from the previous state to the subsequent state in a variety of ways. In the most general case, the consensus network 220 can be configured to provide a series of data entries to the decentralized processing system 120 (e.g., via consensus network smart contract 130) that comprise the instructions to evolve the state of blockchain system 110 from the previous state to the subsequent state. However, in some embodiments, the consensus network 220 may be restrained from sending a series of data entries. In such embodiments, consensus network 220 can be configured to send a first cryptographic hash associated with a data structure that is determined based on the computed subsequent state. The implementation keeper 260 independently recomputes the same subsequent state and sends the resultant series of data entries associated with the data structure. As will be described in more detail below with respect to FIGS. 4-6, the decentralized processing system 120 may then independently verify the veracity of each of the series of data entries by computing a second cryptographic hash for each of the series of data entries and verifying that each of the second cryptographic hashes matches the first cryptographic hash received from the consensus network 220.

In some instances, the case may arise that the decentralized processing system 120 falls behind updating in evolving the state of blockchain 110 to the subsequent state. In such instances, the subsequent state will be evolved in a linear sequence. For example, if the previous state of the system is associated with $t_n$ and the consensus network 220 has already provided data sufficient to evolve the state to the state associated with $t_{n+3}$, the decentralized processing system 120 will first update from the previous state associated with $t_n$ to a first intermediary subsequent state associated with $t_{n+1}$, to a second intermediary subsequent state associated with $t_{n+2}$, and finally to the subsequent state $t_{n+3}$.

Transient storage network 230 and permanent storage network 240 are configured to securely store information related to decentralized processing system 120 separate from blockchain system 110 to overcome storage limitations inherent to blockchain system 110. For example, transient storage network 230 can be configured to store state files associated with the most current state of the blockchain system 110 (e.g., the state of blockchain system 110 at time $t_n$). For example, after the subsequent state is computed by the nodes 222 of the consensus network 220, the consensus network can store the subsequent state as a state file on the transient storage network. The state file is associated with a content identifier, which can be provided to other components of the decentralized processing network 100 to precisely identify the state file on the transient storage network 230. In general, state files may be stored on either the transient storage network 230 or the permanent storage network, but because state files are transient themselves (e.g., the blockchain system 110 is continuously evolving its state from time $t_n$ to time $t_{n+1}$, there is no need to expend resources to permanently store the state file at any given time t. In contrast, the program code of the decentralized processing system 120 may be securely and permanently stored on permanent storage network 240 and associated with a content identifier, so that other components (e.g., the consensus network 220 and/or the implementation keeper 260) within the decentralized processing network 100 can always access the code needed to independently compute the subsequent state of the blockchain system 110. According to some aspects of the disclosed technology, content identifiers can be of any type. For example, in one embodiment, the content identifier can be a cryptographic hash that uniquely identifies the address of the file being stored on either the transient storage network 230 or permanent storage network 240. In other embodiments, the content identifier can be some other kind of linker (e.g., a hyperlink URL, etc.) that identifies the address of the file being stored on either the transient storage network 230 or permanent storage network 240. In certain non-limiting embodiments, the transient storage network 230 can comprise a platform such as the interplanetary file system (IPFS). In certain non-limiting embodiments, the permanent storage network 240 can comprise a platform such as Arweave.

Notably, it should be understood that the storage of the state file related to the current state of the blockchain system 110 need not be stored anywhere, because the current state of the blockchain system 110 can always be reconstructed using only data that has been written to blockchain system 110. The storage of the current state file on transient storage network 230 is useful, however, because it becomes computationally expensive to recreate the state of the blockchain system 110 from initial time to after the blockchain system 110 has been operational for a substantial period of time.

In certain embodiments, the initiation keeper 250 is configured to monitor the cryptographic commitments that are submitted to the decentralized processing system 120 to determine when a threshold has been met indicating that the previous state of the blockchain system 110 should be updated to the subsequent state. In some embodiments, the initiation keeper may be configured to receive an event emitted by the decentralized processing system indicating that the computation of the subsequent state should be initiated. In other embodiments, the initiation keeper 250 monitors the decentralized processing system 120 without the need for receiving an event to indicate that the subsequent state should be computed.

The implementation keeper 260, in some embodiments, is used to independently recompute the subsequent state based on the state file stored on the transient storage network 230 or the permanent storage network 240 and zero or more cryptographic commitments made to the decentralized processing system 120. It should also be understood that in various embodiments, the implementation keeper 260 may independently recompute the subsequent state based on (i) a state file associated with the previous state and the zero or more cryptographic commitments made to the decentralized processing system 12 or (ii) a state file associated with the subsequent state and the zero or more cryptographic commitments made to the decentralized processing system.

In some embodiments, the implementation keeper 260 is not necessary, for example, when the consensus network 220 is not limited in the number of data entries that the consensus network is able to return to the decentralized processing system 120.

In some embodiments, the decentralized blockchain system 110 is configured to receive, from one or more user devices 140, cryptographic commitments to evolve the state of a blockchain network (e.g., blockchain system 110) from a previous state to a subsequent state. The decentralized blockchain network 110 may record each of the one or more commitments in one or more blocks of the blockchain network at the time the commitments are received, but delay the evolution of the state of the blockchain until a threshold is reached. The decentralized blockchain system 110 may receive, from initiation keeper 250, an indication to update the state of the blockchain from the previous state to the subsequent state. However, in other embodiments, the decentralized processing system 120 may determine that a threshold has been reached to evolve the state of the blockchain. The indication/threshold may be of various types. For example, the indication can comprise the one or more blocks of cryptographic commitments recorded on the decentralized processing system 120 exceeding a threshold number of blocks, otherwise referred to as a threshold block height. In some embodiments, the indication can comprise a set amount of time passing since the state was last evolved from the previous state to the subsequent state. For example, the initiation keeper 250 and/or the decentralized processing system 120 can determine when a timestamp associated with the recorded blocks exceeds some threshold value. In response to receiving the indication or otherwise determining the threshold has been met, the decentralized processing system 120 can transmit, to the consensus network 220 (e.g., via consensus network smart contract 130), instructions for the consensus network to compute the subsequent state of the blockchain network (e.g., blockchain system 110) based on the previous state of the blockchain network (e.g., blockchain system 110) and the cryptographic commitments stored as one or more blocks that have not been implemented to evolve the state of the blockchain system 110. The decentralized processing system 120 may be further configured to receive, from the consensus network 220 a first cryptographic hash that is associated with a data structure. The data structure includes the units of work that need to be performed in order to evolve the state of the blockchain system 110. In the context of a cryptocurrency trading platform, the units of work would include the amount of cryptocurrency tokens that need to transferred among users (e.g., users of user devices 140), although in the broadest sense, the disclosure is not limited to enabling a cryptocurrency trading platform. The first cryptographic hash can be used by the decentralized processing system 120 to cryptographically verify that the instructions it receives to evolve the state of the blockchain system 110 are valid, as will be described in more detail below. In some embodiments, the first cryptographic hash can comprise a Merkle tree root hash, and the data structure can comprise a Merkle tree, and the units of work needed to evolve the state of the blockchain can be inscribed within one or more leaves of the Merkel tree. The Merkle tree structure is discussed in more detail with respect to FIG. 6.

The decentralized processing system 120 can be configured to receive, from an implementation keeper 260, a series of data entries that are associated with the data structure generated by the consensus network 220 along with complementary hash values for each of the series of data entries, although in some other embodiments, the consensus network 220 itself may provide the series of data entries and the complementary hash values to decentralized processing system 120. In the case that the decentralized processing system 120 receives the series of data entries, which contain the units of work needed to evolve the state of the blockchain, from the implementation keeper 260, the decentralized processing system 120 can determine a second cryptographic hash for each data entry of the series of data entries using the complementary hash values. The decentralized processing system 120 can independently determine whether (i) the series of data entries have already been implemented to evolve the state of the blockchain system 110 and (ii) whether the series of data entries are correct. To determine whether the series of data entries are correct (e.g., truthful), the decentralized processing system 120 can compute a second cryptographic hash for each data entry based on the data entry and its complementary hash values and determine whether each second cryptographic hash matches the first cryptographic hash. The decentralized processing system 120 can determine whether each of the series of data entries has been previously implemented by checking whether the units of work have been used to evolve the state of the blockchain to the subsequent state of the blockchain system 110. For example, for a state update cycle, the decentralized processing system 120 can be configured to create an empty data structure, and whenever a data entry including units of work is implemented, the data entry can be hashed, and the resultant hash can be added to the empty data structure. Before implementing the next data entry in the series of data entries, the decentralized processing system 120 can be configured to hash the next data entry, and determine whether the hash value exists within the data structure to determine whether the work units associated with the next data entry has previously been implemented within the current state update cycle.

It should be understood that not every data entry within the series of data entries may contain work units for evolving the state of blockchain system 110. For example, some of the series of data entries may comprise units of work for evolving the state of blockchain system 110, while other data entries of the series of data entries can include content identifiers for state files associated with a subsequent state computed by, for example, consensus network 220 and stored on either transient storage network 230 or permanent storage network 240. The content ID of the state file may allow decentralized processing system 120 to access the state file to use for evolving the state of blockchain system 110.

In addition, it should be understood that in certain embodiments, there may exist zero cryptographic commitments associated with the update cycle for updating the blockchain system 110 from the previous state to the subsequent state. Nevertheless, a state change may be recorded, for example, when work units from a previous update cycle have not all been implemented to evolve the state of the blockchain. Such non-implemented work units from a previous cycle may be recorded as a data entry within a data structure (e.g., Merkle leaves of Merkle tree) to allow decentralized processing system 120 to evolve the state of blockchain system 110.

Once the correctness of the series of data entries has been verified and the decentralized processing system 120 determines that the units of work have not been previously implemented, the work units can be executed by the decentralized processing system 120 to evolve the state of the blockchain from the previous state to the subsequent state.

In some embodiments, the data structure generated by the consensus network 220 can be of other types. In a non-limiting example, the data structure can be a Merkle tree, a Verkle tree, a Patricia Trie, and/or a Merkle Patricia Trie, although additional cryptographic data structures are envisioned.

In some embodiments, the decentralized processing system 120 can be configured to store a cryptographic hash associated with its program instructions. The program instructions can be stored on a separate storage network (e.g., the permanent storage network 240) so that other components of the decentralized processing network 100 (e.g., the consensus network 220 and/or the implementation keeper 260) can access the program instructions to perform computations to evolve the state. The program instructions can be verified by computing a hash of the program instructions stored on the permanent storage network 240 and comparing that hash to the hash stored on the decentralized processing system 120.

The initiation keeper 250 can be configured to monitor the decentralized processing system 120 and detect when a threshold has been exceeded to thereby initiate evolving the state of the blockchain system 110.

The consensus network 220 can be configured to compute the subsequent state of blockchain system 110 based on the previous state of the blockchain system 110 (e.g., as stored on transient storage network 230) and the commitments recorded as the one or more blocks of the blockchain system 110. As previously described, one or more nodes 222 of the consensus network 220 can come to consensus as the subsequent state of the blockchain system 110, and the subsequent state can be recorded as a state file on a remote storage platform (e.g., transient storage network 230). In other embodiments, the consensus can occur on the consensus network smart contract 130, or even on the decentralized processing system 120. In some embodiments, the consensus network 220 can transmit a cryptographic hash associated with the data structure (e.g., a Merkle tree root hash) and the content identifier (e.g., cryptographic hash) associated with the state file of the subsequent state to the decentralized processing system 120, in which case the content identifier associated with the state file of the subsequent state need not be included within the data structure. In embodiments in which the nodes 222 of the consensus network 220 come to consensus regarding the subsequent state, the consensus network 220 may compute a data structure (e.g., a Merkle tree) associated with the subsequent state, and determine the cryptographic hash associated with the data structure, which the consensus network 220 may transmit (e.g., via consensus network smart contract 130) to the decentralized processing system 120 for verification purposes. The remote storage platform (e.g., transient storage network 230) can be configured to receive and store the state file determined by the consensus network 220.

The implementation keeper 260 can be configured to compute the data structure based on the state file and transmit a series of data entries of the data structure to the decentralized processing system 120 that contain the information needed to evolve the state of the blockchain system 110 and complementary hashes that are used to cryptographically verify the truthfulness of the series of data entries (as will be explained in more detail with respect to FIGS. 4-6 below).

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data associated with cryptographic commitments made by user devices 140 to the blockchain system 110. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Although the preceding description describes various functions of a consensus network 220, transient storage network 230, permanent storage network 240, initiation keeper 250, and implementation keeper 260, in some embodiments, some or all of these functions may be carried out by a single computing device.

Figure 2:
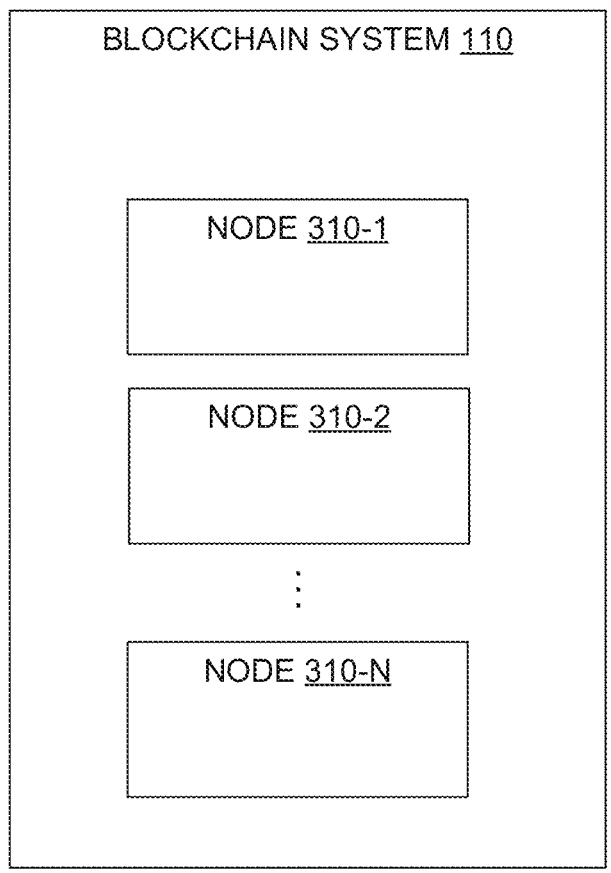
FIG. 2 is a block diagram of an example blockchain system used to provide a decentralized processing network, according to an example implementation of the disclosed technology.

FIG. 2 is a block diagram of an example blockchain system 110 used to provide a decentralized processing network, according to an example implementation of the disclosed technology. As described above with respect to FIG. 1, aspects of the decentralized processing network 100 can be implemented across a distributed web of computers, operating as nodes. FIG. 2 shows that blockchain system 110 is implemented across a plurality of nodes 310 (e.g., nodes 310-1, 310-2, ..., 310-N). Nodes 310 each include memory containing program instructions necessary to implement the protocol used by the blockchain system 110, the decentralized processing system 120, and the consensus network smart contract 130. In a similar manner, nodes 222 each include memory containing program instructions necessary to implement the functionality of consensus network 220. In a similar manner, transient storage network 230 is implemented by a series of nodes 232 (nodes 232-1, 232-2, ..., 232-N) that each include memory containing program instructions necessary to implement the functionality of transient storage network 230 and permanent storage network 240 is implemented by a series of nodes 242 (nodes 242-1, 242-2, ..., 242-N) that each include memory containing program instructions necessary to implement the functionality of transient storage network 230.

Figure 3:
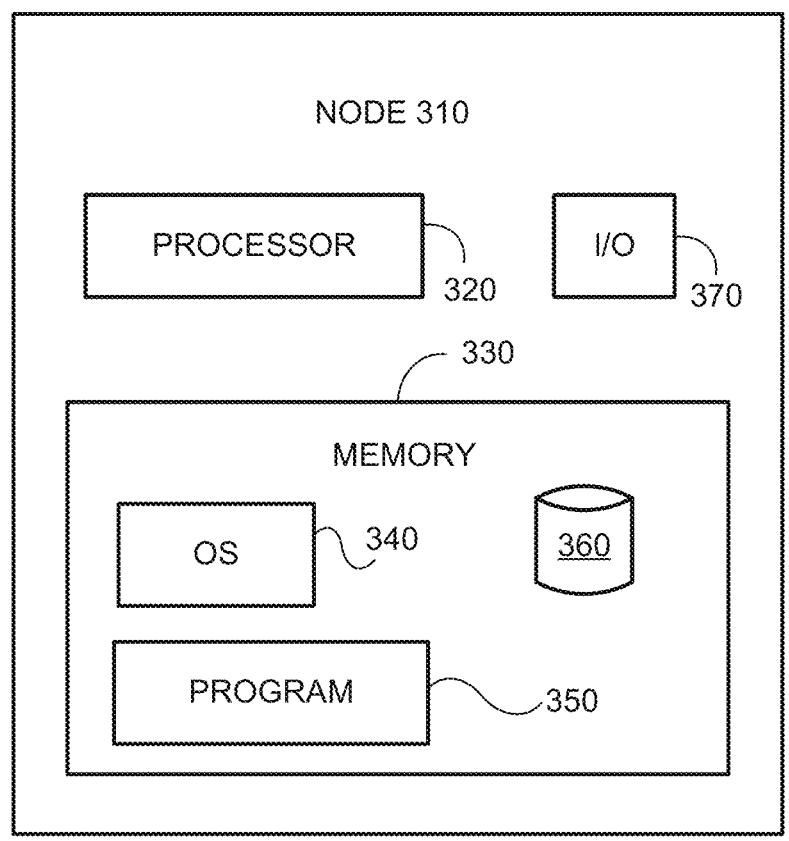
FIG. 3 is a block diagram of an example node 310 used to enable the functionality of the blockchain system, according to an example implementation of the disclosed technology.

FIG. 3 is a block diagram of an example node 310 used to enable the functionality of the blockchain system 110, according to an example implementation of the disclosed technology. According to some embodiments, nodes 222, 232, and 242, and user devices 140, as depicted in FIGS. 1-2 and described above, may have a similar structure and components that are similar to those described with respect to node 310 shown in FIG. 3. As shown, the node 310 may include a processor 320, an input/output (I/O) device 370, a memory 330 containing an operating system (OS) 340 and a program 350. In certain example implementations, the node 310 may be a single server or may be configured as a distributed computer system including multiple servers or computers that interoperate to perform one or more of the processes and functionalities associated with the disclosed embodiments. In some embodiments node 310 may be one or more servers from a serverless or scaling server system. In some embodiments, the node 310 may further include a peripheral interface, a transceiver, a mobile network interface in communication with the processor 320, a bus configured to facilitate communication between the various components of the node 310, and a power source configured to power one or more components of node 310.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 320 to communicate with other devices via wired or wireless networks, whether local or wide area, private or public, as known in the art. A power source may be configured to provide an appropriate alternating current (AC) or direct current (DC) to power components.

The processor 320 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 320 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 320 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 320 may be a single core processor that is configured with virtual processing technologies. In certain embodiments, the processor 320 may use logical processors to simultaneously execute and control multiple processes. The processor 320 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the node 310 may include one or more storage devices configured to store information used by the processor 320 (or other components) to perform certain functions related to the disclosed embodiments. In one example, the node 310 may include the memory 330 that includes instructions to enable the processor 320 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The node 310 may include a memory 330 that includes instructions that, when executed by the processor 320, perform one or more processes consistent with the functionalities disclosed herein. Methods, systems, and articles of manufacture consistent with disclosed embodiments are not limited to separate programs or computers configured to perform dedicated tasks. For example, the node 310 may include the memory 330 that may include one or more programs 350 to perform one or more functions of the disclosed embodiments. For example, in some embodiments, the node 310 may additionally manage cryptographic commitments received by blockchain system 110 from user devices 140 via a program 350.

The processor 320 may execute one or more programs 350 located remotely from the node 310. For example, the node 310 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 320, perform one or more processes consistent with the disclosed embodiments. In some embodiments, the memory 330 may include a database 360 for storing related data to enable the node 310 to perform one or more of the processes and functionalities associated with the disclosed embodiments.

The node 310 may also be communicatively connected to one or more memory devices (e.g., databases) locally or through a network. The remote memory devices may be configured to store information and may be accessed and/or managed by the node 310. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The node 310 may also include one or more I/O devices 370 that may comprise one or more interfaces for receiving signals or input from devices and providing signals or output to one or more devices that allow data to be received and/or transmitted by the node 310. For example, the node 310 may include interface components, which may provide interfaces to one or more input devices, such as one or more keyboards, mouse devices, touch screens, track pads, trackballs, scroll wheels, digital cameras, microphones, sensors, and the like, that enable the node 310 to receive data from a user (such as, for example, via the user device 140).

In examples of the disclosed technology, the node 310 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the node 310 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the node 310 may include a greater or lesser number of components than those illustrated.

Figure 4:
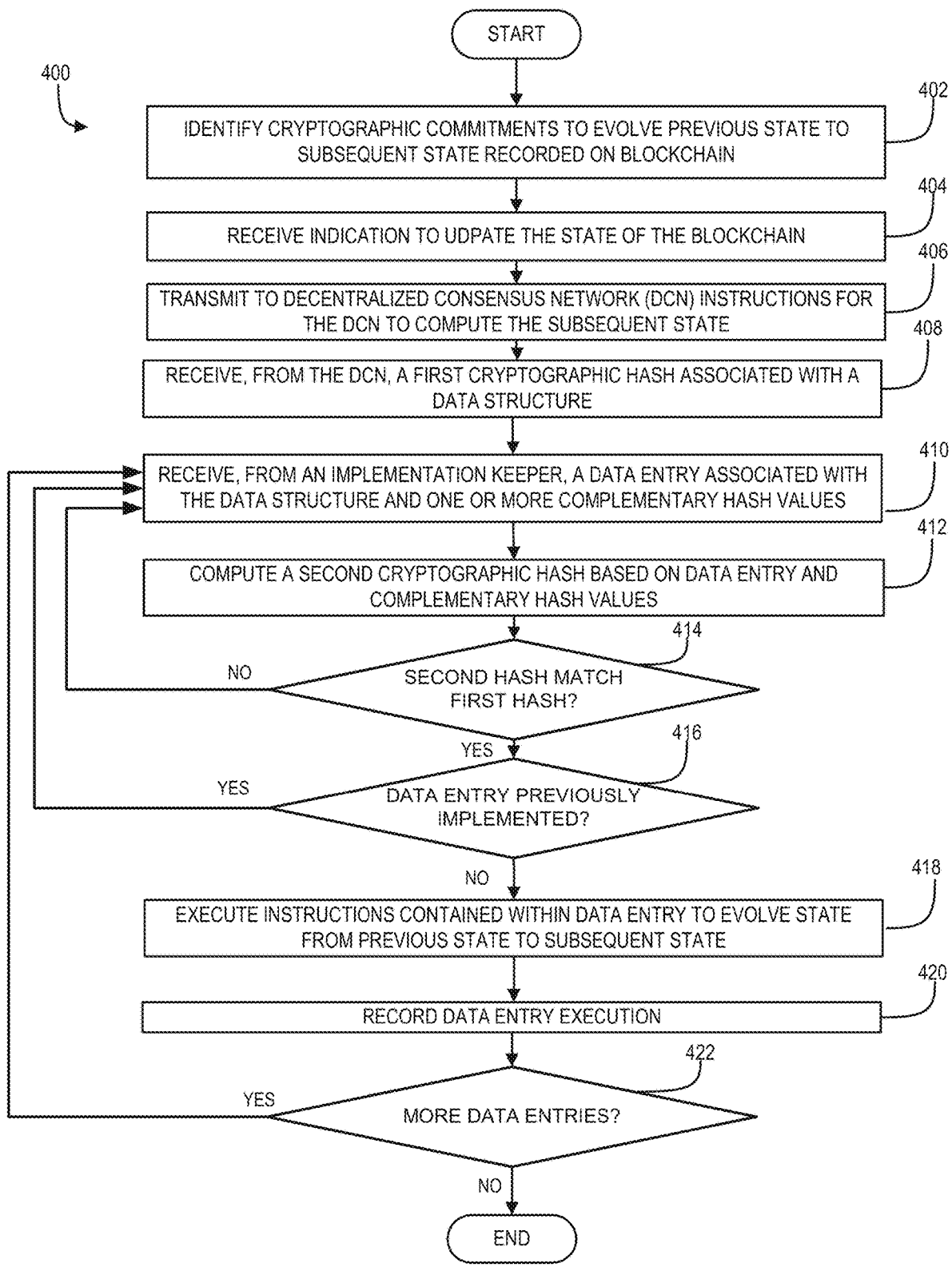
FIG. 4 is a flow diagram illustrating a method for providing a decentralized processing network in accordance with certain embodiments of the disclosed technology.

FIG. 4 is a flow diagram illustrating a method 400 for providing a decentralized processing network 100, in accordance with certain embodiments of the disclosed technology. The steps of method 400 may be performed by one or more components of the decentralized processing network 100 (e.g., blockchain system 110 including decentralized processing system 120 and/or consensus network smart contract 130, user device 140, consensus network 220, transient storage network 230, permanent storage network 240, initiation keeper 250, and/or implementation keeper 260), as described in more detail with respect to FIGS. 1-3.

In block 402, the decentralized processing system 120 may identify zero or more cryptographic commitments recorded in one or more blocks of the blockchain (e.g., onto blocks of blockchain system 110) to evolve a previous state of the blockchain system 110 to a subsequent state of blockchain system 110.

In block 404, the decentralized processing system 120 may receive an indication to update the state of the blockchain. It should be noted that in some embodiments, rather than receiving an indication, the decentralized processing system 120 itself may determine that a threshold has been reached and respond by initiating an update to the state of blockchain system 110.

In block 406, the decentralized processing system 120 may transmit to the consensus network 220 instructions for the consensus network 220 to compute the subsequent state of the blockchain system 110. The instructions to compute the subsequent state may be based on the previous state (e.g., as stored by the transient storage network 230) and the commitments recorded in one or more blocks of blockchain system 110.

In block 408, the decentralized processing system 120 may receive, from the consensus network 220, a first cryptographic hash associated with a data structure. The first cryptographic hash may be determined by the consensus network 220 based on the computed subsequent state. In some embodiments, the data structure may comprise a Merkle tree, a Verkle tree, a Patricia Trie, and/or a Merkle Patricia Trie, although other data structures are envisioned in other embodiments.

In block 410, the decentralized processing system 120 may receive, from an implementation keeper, a data entry associated with the data structure and one or more complementary hash values. The one or more complementary hash values may be used by the decentralized processing system to compute a second cryptographic hash. In some embodiments, the first cryptographic hash may be used by the decentralized processing system 120 to cryptographically verify the truthfulness of the series of the data entries.

In block 412, the decentralized processing system 120 may compute a second cryptographic hash for the data entry. In embodiments for which the data structure comprises a Merkle tree, the data entry may comprise a leaf of the Merkle tree. The process for computing a second cryptographic hash for the data entry is discussed with respect to FIG. 6.

In decision block 414, the decentralized processing system 120 determines whether the second hash matches the first cryptographic hash. If the second hash does not match the first cryptographic hash, the units of work associated with the respective data entry are rejected and the method returns to block 410 in which the decentralized processing system 120 receives a subsequent data entry from the implementation keeper. In response to the second cryptographic hash matching the first cryptographic hash, the method moves to decision block 416.

In decision block 416, the decentralized processing system 120 may determine whether the work units associated with the respective data entry have been previously implemented by checking whether the units of work have been used to evolve the state of the blockchain to the subsequent state of the blockchain system 110. For example, for a state update cycle, the decentralized processing system 120 can be configured to create an empty data structure, and whenever a data entry including units of work is implemented, the data entry can be hashed, and the resultant hash can be added to the empty data structure. Before implementing the next data entry in the series of data entries, the decentralized processing system 120 can be configured to hash the next data entry, and determine whether the hash value exists within the data structure to determine whether the work units associated with the next data entry has previously been implemented within the current state update cycle. In response to determining that work units within the respective data entry have been previously implemented in the current state update cycle, the decentralized processing system 120 can reject the units of work associated with the respective data entry and the method may move back to block 410, in which the decentralized processing system 120 receives a subsequent data entry from the implementation keeper. In response to determining that work units within the respective data entry have not been previously implemented in the current state update cycle, the method may move to block 418.

In block 418, the decentralized processing system 120 may execute instructions within the data entry to evolve the state from the previous to a subsequent state. In block 420, the method can include recorded execution of the work units associated with the respective data entry, for example by recording a hash value within a data structure, as discussed with respect to block 416.

In decision block 422, the decentralized processing system 120 can determine whether all data entries for the update cycle have been implemented. In response to determining that not all data entries have been implemented, the method may move back to block 410, in which the decentralized processing system 120 receives a subsequent data entry from the implementation keeper. In response to determining that all data entries have been implemented, the method may end.

In some embodiments, prior to implementing each of the work units recorded in the series of data entries, the decentralized processing system 120 may also verify whether each data entry has previously been implemented to evolve the state of the blockchain system 110. Even if the second cryptographic hash of a respective data entry matches the first cryptographic hash, the work units associated with the respective data entry may be rejected if the decentralized processing system 120 determines it was already implemented to evolve the state of blockchain system 110.

Figure 5:
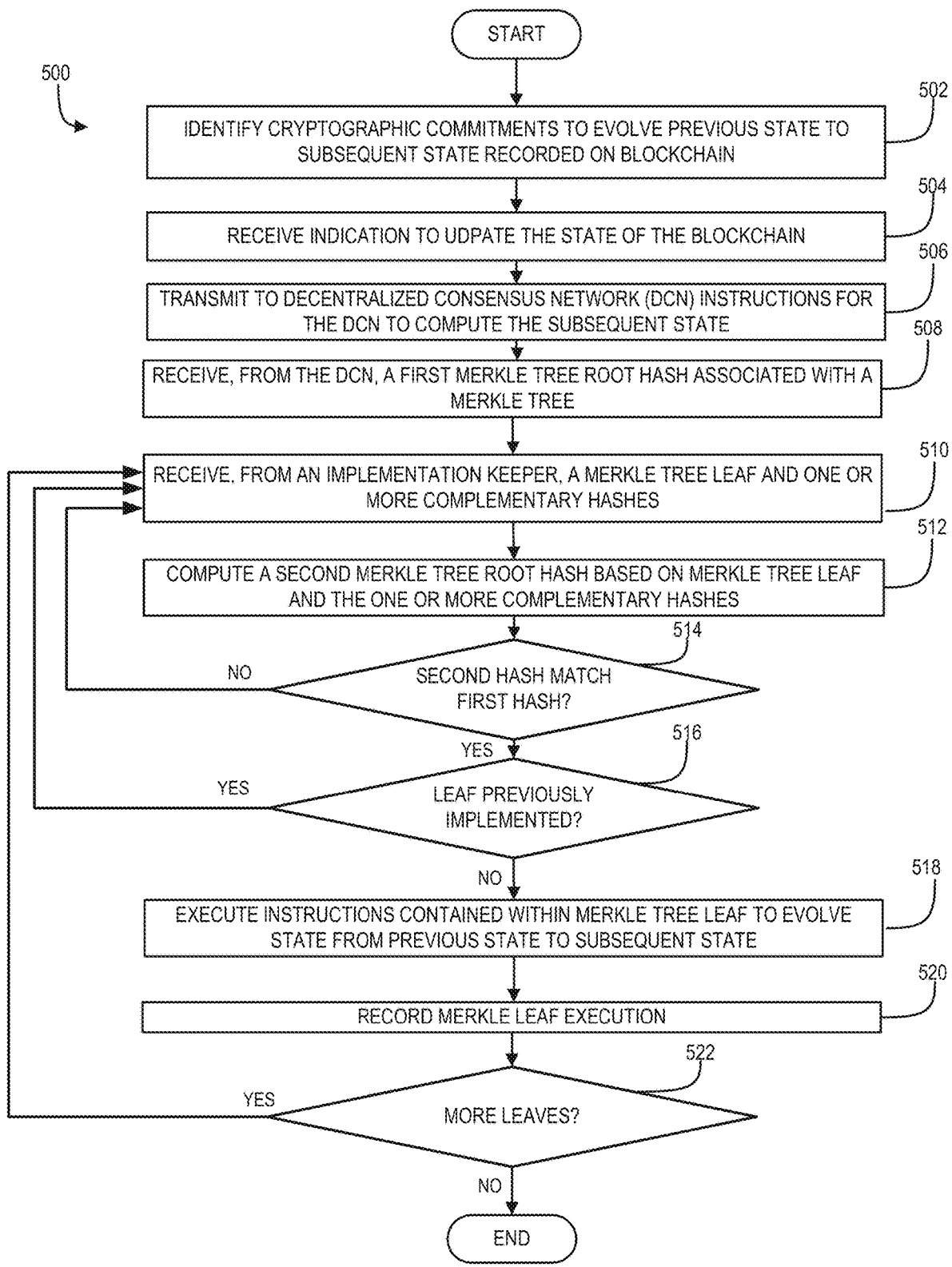
FIG. 5 is a flow diagram illustrating a method for providing a decentralized processing network in accordance with certain embodiments of the disclosed technology.

FIG. 5 is a flow diagram illustrating a method 500 for providing a decentralized processing network 100, in accordance with certain embodiments of the disclosed technology. The steps of method 500 may be performed by one or more components of the decentralized processing network 100 (e.g., e.g., blockchain system 110 including decentralized processing system 120 and/or consensus network smart contract 130, user device 140, consensus network 220, transient storage network 230, permanent storage network 240, initiation keeper 250, and/or implementation keeper 260), as described in more detail with respect to FIGS. 1-3.

Method 500 of FIG. 5 is similar to system 100 of FIG. 1. The descriptions of blocks 502, 504, 506, and 522 in method 500 are similar to the respective descriptions of blocks 402, 404, 406, and 422 of method 400 and are not repeated herein for brevity. However, blocks 508, 510, 512, 514, 516, 518, 520, and 522 are different from blocks 408, 410, 412, 414, 416, 418, 420, and 422 and are described below.

In block 508, the decentralized processing system 120 may receive, from the consensus network 220, a first Merkle tree root hash associated with a Merkle tree. The first Merkle tree root hash may be determined by the consensus network 220 based on the computed subsequent state.

In block 510, the decentralized processing system 120 may receive, from an implementation keeper, a Merkle tree leaf associated with the Merkle tree and one or more complementary hash values. For example, the complementary hash values may correspond to complementary branches of the Merkle tree associated with a root to leaf path for the respective Merkle tree leaf. The one or more complementary hash values may be used by the decentralized processing system 120 to compute a second Merkle tree root hash. In some embodiments, the first Merkle tree root hash may be used by the decentralized processing system 120 to cryptographically verify the truthfulness of the Merkle tree leaves.

In block 512, the decentralized processing system 120 may compute a second Merkle tree root hash for the Merkle leaf. The process for computing a second Merkle tree root hash for the Merkle leaf is discussed with respect to FIG. 6.

In decision block 514, the decentralized processing system 120 determines whether the second Merkle tree root hash matches the first Merkle tree root hash. If the second Merkle tree root hash does not match the first Merkle tree root hash, the units of work associated with the respective Merkle leaf are rejected and the method returns to block 510 in which the decentralized processing system 120 receives a subsequent Merkle leaf from the implementation keeper. In response to the second Merkle tree root hash matching the first Merkle tree root hash, the method moves to decision block 416.

In decision block 516, the decentralized processing system 120 may determine whether the work units associated with the respective Merkle leaf have been previously implemented by checking whether the units of work have been used to evolve the state of the blockchain to the subsequent state of the blockchain system 110. For example, for a state update cycle, the decentralized processing system 120 can be configured to create an empty data structure, and whenever a Merkle leaf including units of work is implemented, the Merkle leaf can be hashed, and the resultant hash can be added to the empty data structure. Before implementing the next Merkle leaf in the series of Merkle leaves, the decentralized processing system 120 can be configured to hash the next Merkle leaf, and determine whether the hash value exists within the data structure to determine whether the work units associated with the next Merkle leaf have previously been implemented within the current state update cycle. In response to determining that work units within the respective Merkle leaf have been previously implemented in the current state update cycle, the decentralized processing system 120 can reject the units of work associated with the respective Merkle leaf and the method may move back to block 510, in which the decentralized processing system 120 receives a subsequent Merkle leaf from the implementation keeper. In response to determining that work units within the respective Merkle leaf have not been previously implemented in the current state update cycle, the method may move to block 518.

In block 518, the decentralized processing system 120 may execute instructions within the Merkle leaf to evolve the state from the previous to a subsequent state. In block 520, the method can include recorded execution of the work units associated with the respective Merkle leaf, for example by recording a hash value within a data structure, as discussed with respect to block 516.

In block 522, the decentralized processing system 120 can determine whether all Merkle leaves for the update cycle have been implemented. In response to determining that not all Merkle leaves have been implemented, the method may move back to block 510, in which the decentralized processing system 120 receives a subsequent Merkle leaf from the implementation keeper. In response to determining that all Merkle leaves have been implemented, the method may end.

In some embodiments, prior to implementing each of the work units recorded in the leaves of the Merkle tree, the decentralized processing system 120 may also verify whether each leaf of the Merkle tree has previously been implemented to evolve the state of the blockchain system 110. Even if the second Merkle root hash of a respective Merkle leaf matches the first Merkle root hash, the work units associated with the respective Merkle leaf may be rejected if the decentralized processing system 120 determines it was already implemented to evolve the state of blockchain system 110.

Figure 6:
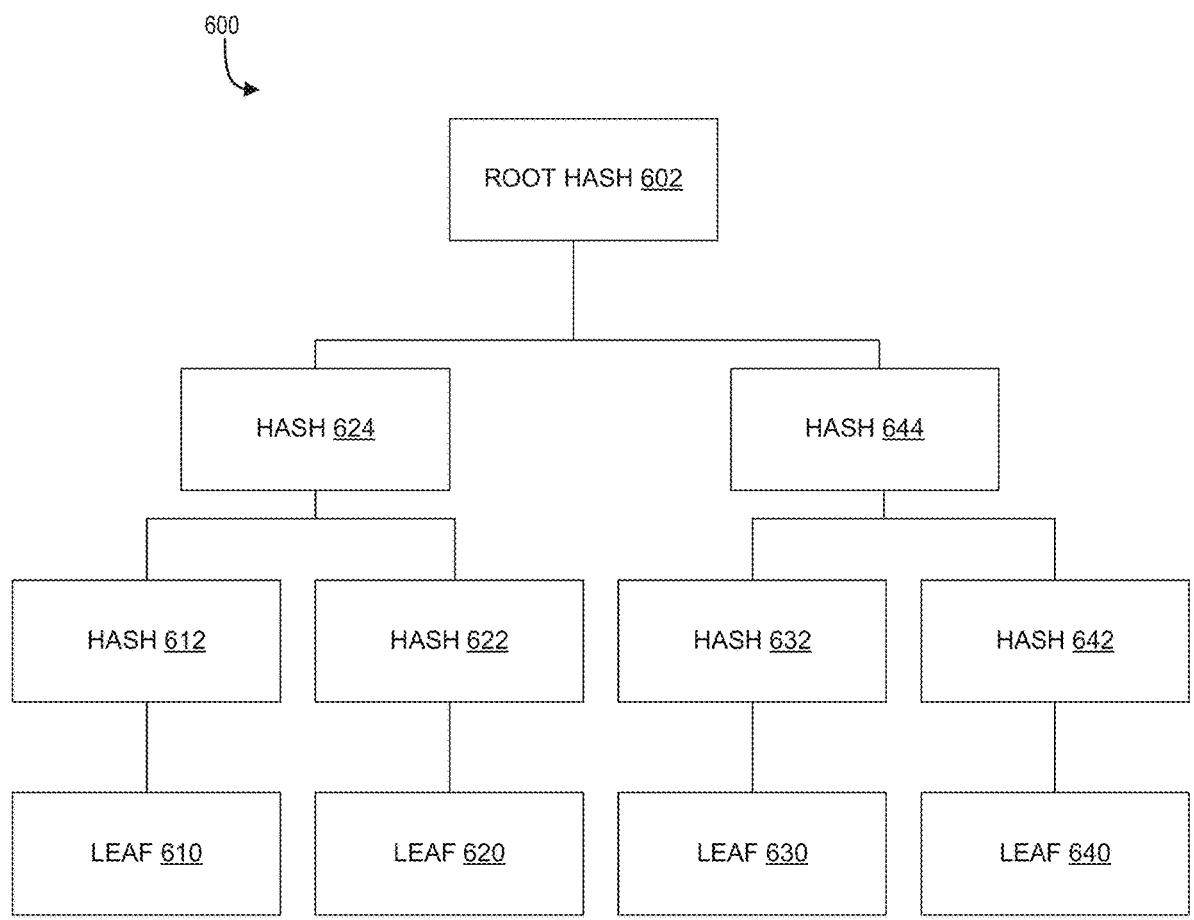
FIG. 6 is a block diagram illustrating a data structure for enabling a decentralized processing network in accordance with certain embodiments of the disclosed technology.

FIG. 6 is a block diagram illustrating a data structure for enabling a decentralized processing network in accordance with certain embodiments of the disclosed technology. More specifically FIG. 6 represents a Merkle tree 600. Although Merkle tree is shown having four leaves 610, 620, 630, and 640, and a depth of 3 layers, Merkle tree 600 can have any number of leaves and can comprise various depths. Merkle tree 600 is a data structure wherein zero or one leaf (e.g., leaf 610) may contain the content identifier (e.g., cryptographic hash) of the state file stored on the transient storage network 230, zero leaves or one leaf may store work units related to an escape hatch activated in the case that the consensus network becomes unavailable (described in more detail with respect to FIG. 7), and zero or more leaves (e.g., leaf 630 and leaf 640) that summarize the work units needed to be carried by the decentralized processing system 120 to evolve the state of blockchain system 110 from the previous state to the subsequent state. Merkle tree 600 also includes a hash associated with each corresponding leaf (e.g., hash 612, 622, 632, and 642 corresponding to leaf 610, 620, 630, 640, respectively). In addition, the next layer of the Merkle tree 600 includes a hash of each adjacent neighbor along the path from a respective leaf to the root hash 602. In other words, each node of the Merkle tree that is not a leaf is made up of the hash of combined hashes of its two (direct) child nodes. In the present example, hash 612 and hash 622 are hashed together to form hash 624, and in a similar manner, hash 632 and hash 642 are hashed together to form hash 644. Likewise, hash 624 and hash 644 are hashed together to generate the root hash 602.

In some embodiments, one of the leaves (e.g., leaf 620) may contain a Merkle tree root hash of a second Merkle tree that is associated with "escape hatch" units of work that would be implemented by the decentralized processing system 120 to revert the state of blockchain 110 to the last known state, as will be described in more detail with respect to FIG. 7.

In certain embodiments, the decentralized processing system 120 is transmitted the root hash 602 (e.g., the first cryptographic hash) from the consensus network 220, a series of data entries from the implementation keeper 260, and complementary hashes for each data entry of the series of data entries. In the embodiment in which the data structure is a Merkle tree, the series of data entries are associated with the units of work recorded in the leaves of Merkle tree 600 (e.g., leaves 610, 620, 630, and 640). The series of data entries are also accompanied by hashes corresponding to complementary branches of the Merkle tree associated with the root to leaf path. For example, for leaf 610, the hash 622, and the hash 644 would be transmitted with leaf 610 to the decentralized processing system 120 in order for decentralized processing system to be able to cryptographically verify the truthfulness of the work units specified in leaf 610. Decentralized processing network 120 can accomplish this by computing hash 612 based on leaf 610, combining hash 612 with hash 622 (provided as a complementary hash) to compute hash 624, and computing root hash 602 by combining hash 624 with hash 644 (provided as a complementary hash). A similar operation can be performed for leaf 620 (e.g., by providing hash 612 and hash 644), leaf 630 (e.g., by providing hash 624 and hash 642), and leaf 640 (e.g., by providing hash 632 and hash 624). When other data structures are employed in place of Merkle tree 600 by consensus network 220, the decentralized processing system 120 may undergo a similar cryptographic process to verify the truthfulness of the work units (e.g., series of data entries) provided.

Figure 7:
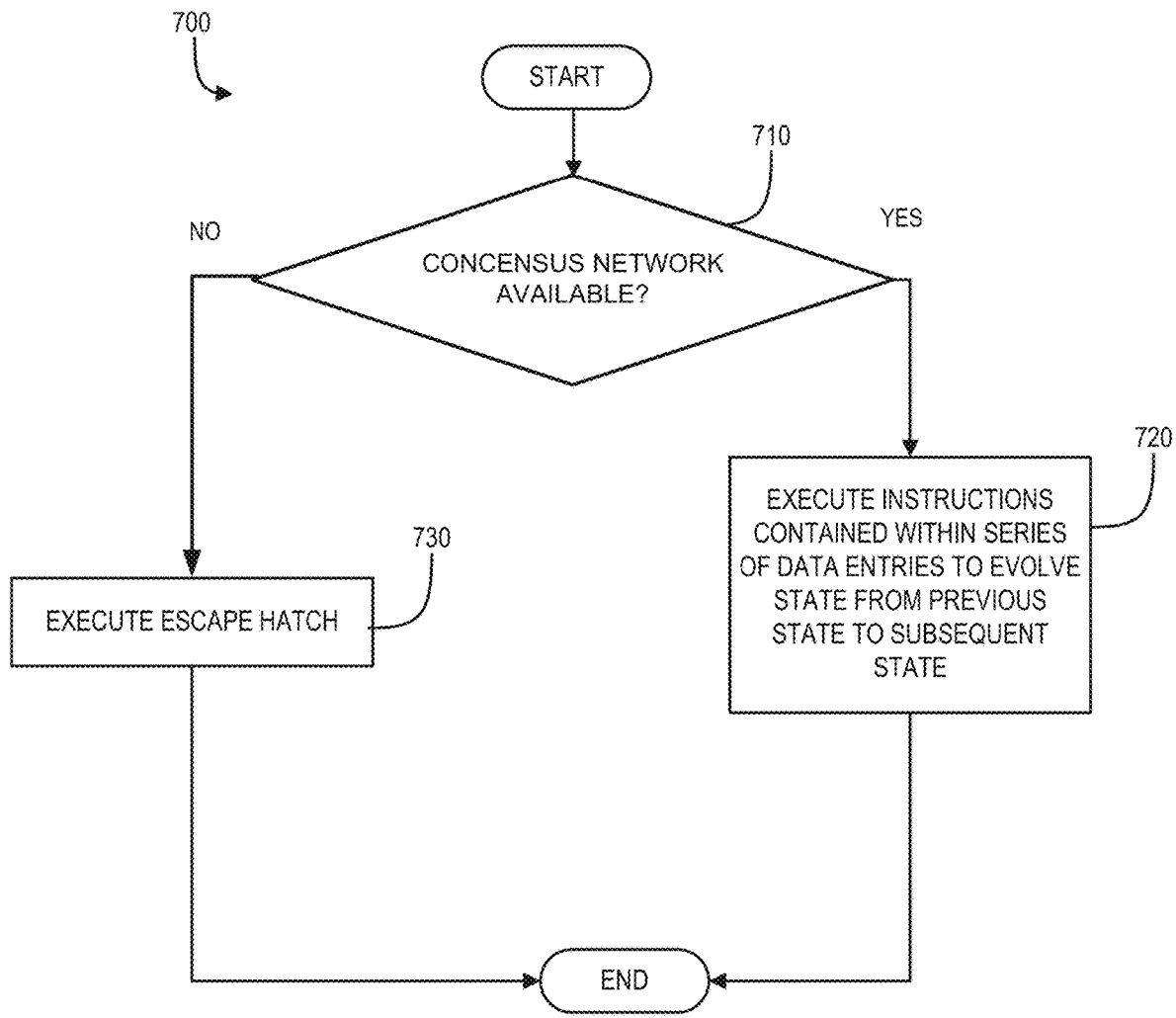
FIG. 7 is a flow diagram illustrating an escape hatch method for the decentralized processing network in accordance with certain embodiments of the disclosed technology.

FIG. 7 is a flow diagram illustrating an escape hatch method for the decentralized processing network in accordance with certain embodiments of the disclosed technology. The steps of method 700 may be performed by one or more components of the decentralized processing network 100 (e.g., e.g., blockchain system 110 including decentralized processing system 120 and/or consensus network smart contract 130, user device 140, consensus network 220, transient storage network 230, permanent storage network 240, initiation keeper 250, and/or implementation keeper 260), as described in more detail with respect to FIGS. 1-3.

In decision block 710, the decentralized processing system 120 may determine whether the consensus network 220 is available. For example, the decentralized processing system 120 may have a threshold time during which it waits for the consensus network 220 to transmit information necessary to evolve the state of the blockchain system 110. If the consensus network responds within the threshold time in decision block 710, the method 700 may move to block 720, in which the decentralized processing system 120 executes instructions contained within the series of data entries (or leaves of the Merkle tree) to evolve the state from the previous state to the subsequent state.

In response to the decentralized processing system 120 determining that the consensus network 220 is unavailable, the method 700 may move to block 730. In block 730, the decentralized processing system 120 may execute an escape hatch which may include causing the system to reject evolving the state of the blockchain by not implementing the zero or more cryptographic commitments. In addition, as a result of executing the escape hatch, the decentralized processing system 120 may cause the blockchain system 110 to reject any further cryptographic commitments being made by users via user device(s) 140. In this regard, in some embodiments the escape hatch may work in the following way. For example, returning to FIG. 6, leaf 620 may comprise a Merkle tree root hash associated with the escape hatch units of work, and the decentralized processing system 120 may receive hash 612 and hash 644 as the complementary branches along the root to leaf path. Using the leaf 620, hash 612, and hash 644, the decentralized processing system can cryptographically verify the truthfulness of Merkle tree root hash associated with the escape hatch units of work. Decentralized processing system 120 may also receive a second set of one or more data entries (e.g., leaves of a second Merkle tree) associated with the escape hatch work units along with cryptographic hashes corresponding to complementary branches of a second data structure (e.g., the second Merkle tree). The second set of one or more data entries may be associated with the escape hatch units of work for returning the blockchain system 110 to the last known recorded state. The decentralized processing system 120 may compute the Merkle tree root hash of the second Merkle tree, and compare it to the Merkle tree root hash stored in leaf 620 to verify the truthfulness of the escape hatch units of work. The decentralized processing system 120 may further determine whether the escape hatch work units were previously implemented to avoid implementing the same leaf more than once, and execute the instructions present within the leaves of the second Merkle tree to evolve the state of blockchain to the last known recorded state.

In some examples, disclosed systems or methods may involve one or more of the following clauses:

Clause 1: A decentralized processing network comprising: a decentralized processing system configured to: receive, from one or more user devices, zero or more cryptographic commitments to evolve a state of the blockchain network from a previous state to a subsequent state; record each of the one or more commitments in one or more blocks of the blockchain network; receive, from an initiation keeper an indication that the recorded one or more blocks exceed a threshold number of blocks; in response to the indication, transmit, to a decentralized consensus network remote from the decentralized blockchain network, instructions for the decentralized consensus network to compute the subsequent state of the blockchain network based on (i) the previous state of the blockchain network and (ii) the commitments recorded as the one or more blocks of the blockchain network; receive a first Merkle tree root hash from a decentralized consensus network; receive a series of Merkle tree leaves associated with a Merkle tree and a plurality of hashes corresponding to complementary branches of the Merkle tree associated with a root to leaf path for each of the series of Merkle tree leaves from an implementation keeper; compute, for each of the series of Merkle tree leaves using the plurality of hashes, a second Merkle tree root hash; for each of the series of Merkle tree leaves, using the plurality of hashes, determine that the second Merkle tree root hash matches the first Merkle tree root hash; and execute instructions contained within each of the Merkle tree leaves to evolve the state of the blockchain from the previous state to the subsequent state; the initiation keeper configured to: monitor the decentralized processing system; and detect when the recorded one or more blocks of the blockchain exceed a threshold number of blocks; the decentralized consensus network configured to: compute a subsequent state of the blockchain network based on (i) the previous state and (ii) the commitments recorded as the one or more blocks of the blockchain network; record a state file associated with the subsequent state to a remote storage platform; compute the Merkle tree associated with the subsequent state; determine the first Merkle tree root hash associated with the Merkle tree; and transmit the first Merkle tree root hash to the decentralized blockchain network; a remote storage platform configured to: receive, from the decentralized consensus network, the state file; and store the state file; an implementation keeper configured to: compute the Merkle tree based on the state file and the zero or more cryptographic commitments; and transmit, to the decentralized blockchain network, a series of Merkle tree leaves associated with the Merkle tree and the plurality of hashes of the Merkle tree.

Clause 2: A decentralized processing system comprising: one or more processors; one or more non-transitory memories in communication with the one or more processors storing instructions thereon that when executed by the one or more processors are configured to cause the system to: identify zero or more cryptographic commitments to evolve a state of a blockchain from a previous state to a subsequent state recorded in one or more blocks of the blockchain; receive an indication to update the state of the blockchain from the previous state to the subsequent state; in response to the indication, transmit, to a decentralized consensus network remote from the decentralized processing system, instructions for the decentralized consensus network to compute a subsequent state based on (i) the previous state and (ii) the commitments recorded in one or more blocks of the blockchain; receive, from the decentralized consensus network, a first cryptographic hash associated with a data structure, the first cryptographic hash determined by the decentralized consensus network based on the computed subsequent state; receive, from an implementation keeper a series of data entries associated with the data structure and one or more complementary hashes for each data entry of the series of data entries; compute, for each of the series of data entries, a second cryptographic hash; for each of the series of data entries, determine that the second cryptographic hash matches the first cryptographic hash; and execute instructions contained within the series of data entries to evolve the state of the blockchain from the previous state to the subsequent state.

Clause 3: The decentralized processing system of clause 2, wherein: the data structure comprises a Merkle tree; the first cryptographic hash comprises a first Merkle tree root hash; each of the second cryptographic hashes comprise a second Merkle tree root hash; the series of data entries comprise a series of Merkle tree leaves associated with the Merkle tree; and the one or more complementary hashes for each data entry of the series of data entries comprise one or more complementary hashes of the Merkle tree for each Merkle tree leaf of the series of Merkle tree leaves.

Clause 4: The decentralized processing system of clause 2, wherein the one or more non-transitory memories store further instructions, that when executed by the one or more processors, are configured to cause the system to: determine whether the first cryptographic hash has previously been implemented to evolve the state of the blockchain; in response to the first cryptographic hash having previously been implemented, do not evolve the previous state to the subsequent state.

Clause 5: The decentralized processing system of clause 2, wherein the one or more non-transitory memories store further instructions, that when executed by the one or more processors, are configured to cause the system to: determine, for each data entry of the series of data entries, whether a respective data entry has previously been implemented to evolve the state of the blockchain; reject the respective data entry responsive to determining that the respective Merkle tree leaf has been previously implemented.

Clause 6: The decentralized processing system of clause 2, wherein the data structure is selected from a Merkle tree, a Verkle tree, a Patricia Trie, and a Merkle Patricia Trie.

Clause 7: The decentralized processing system of clause 2, wherein the non-transitory memory includes further instructions, that when executed by the one or more processors, are configured to cause the system to store a cryptographic hash associated with program instructions executed by the decentralized consensus network.

Clause 8: The decentralized processing system of clause 2, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

Clause 9: The decentralized processing system of clause 2, wherein the decentralized consensus network comprises the implementation keeper.

Clause 10: The decentralized processing system of clause 3, wherein the series of Merkle tree leaves comprise data for work units to be carried out by the decentralized processing system to evolve the previous state to the subsequent state.

Clause 11: The decentralized processing system of clause 3, wherein at least one Merkle tree leaf of the series of Merkle tree leaves comprises a cryptographic hash associated with the subsequent state.

Clause 12: The decentralized processing system of clause 3, wherein one or more Merkle tree leaves of the series of Merkle tree leaves comprise instructions to evolve the state of the blockchain from the previous state to the subsequent state.

Clause 13: The decentralized processing system of clause 3, wherein the indication comprises the recorded one or more blocks exceeding a threshold number of blocks.

Clause 14: The decentralized processing system of clause 3, wherein the indication comprises a timestamp associated with the recorded one or more blocks exceeding a threshold value.

Clause 15: A decentralized processing system comprising: one or more processors; one or more non-transitory memories in communication with the one or more processors storing instructions thereon that when executed by the one or more processors are configured to cause the system to: identify zero or more cryptographic commitments to evolve a state of a blockchain from a previous state to a subsequent state recorded in one or more blocks of the blockchain; receive an indication to update the state of the blockchain from the previous state to the subsequent state; in response to the indication, transmit, to a decentralized consensus network remote from the decentralized processing system, instructions for the decentralized consensus network to compute the subsequent state based on (i) the previous state and (ii) the commitments recorded in one or more blocks of the blockchain; receive, from the decentralized consensus network, a first Merkle tree root hash associated with a Merkle tree, the first Merkle tree root hash determined by the decentralized consensus network based on the computed subsequent state; receive, from an implementation keeper a series of Merkle tree leaves associated with the Merkle tree and a plurality of hashes corresponding to complementary branches of the Merkle tree associated with a root to leaf path for each of the series of Merkle tree leaves from an implementation keeper; compute, for each of the series of Merkle tree leaves using the plurality of hashes, a second Merkle tree root hash; for each of the series of Merkle tree leaves, using the plurality of hashes, determine that the second Merkle tree root hash matches the first Merkle tree root hash; and execute instructions contained within each of the Merkle tree leaves to evolve the state of the blockchain from the previous state to the subsequent state.

Clause 16: The decentralized processing system of clause 15, wherein the one or more non-transitory memories store further instructions, that when executed by the one or more processors, are configured to cause the system to: determine whether the first Merkle tree root hash has previously been implemented to evolve the state of the blockchain; in response to the first Merkle tree root hash having previously been implemented, do not evolve the previous state to the subsequent state Clause 17: The decentralized processing system of clause 15, wherein the one or more non-transitory memories store further instructions, that when executed by the one or more processors, are configured to cause the system to: determine, for each of the series of Merkle tree leaves, whether a respective Merkle tree leaf has previously been implemented to evolve the state of the blockchain; reject the respective Merkle tree leaf responsive to determining that the respective Merkle tree leaf has been previously implemented.

Clause 18: The decentralized processing system of clause 15, wherein the non-transitory memory includes further instructions, that when executed by the one or more processors, are configured to cause the system to store a cryptographic hash associated with program instructions executed by the decentralized consensus network.

Clause 19: The decentralized processing system of clause 15, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

Clause 20: The decentralized processing system of clause 15, wherein the decentralized consensus network comprises the implementation keeper.

Clause 21: The decentralized processing system of clause 15, wherein the series of Merkle tree leaves comprise data for work units to be carried out by the decentralized processing system to evolve the previous state to the subsequent state.

Clause 22: The decentralized processing system of clause 15, wherein at least one Merkle tree leaf of the series of Merkle tree leaves comprises a cryptographic hash associated with the subsequent state.

Clause 23: The decentralized processing system of clause 15, wherein the indication comprises the recorded one or more blocks exceeding a threshold number of blocks.

Clause 24: The decentralized processing system of clause 15, wherein the indication comprises a timestamp associated with the recorded one or more blocks exceeding a threshold value.

Clause 25: The decentralized processing system of clause 15, wherein the plurality of hashes correspond to complementary branches of the Merkle tree associated with a root to leaf path for each of the series of Merkle tree leaves.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decentralized processing network comprising:
   a decentralized processing system configured to:
   receive, from one or more user devices, zero or more cryptographic commitments to evolve a state of a decentralized blockchain network from a previous state to a subsequent state;
   record each of one or more commitments in one or more blocks of the decentralized blockchain network;
   receive, from an initiation keeper an indication that the recorded one or more blocks exceed a threshold number of blocks;
   in response to the indication, transmit, to a decentralized consensus network remote from the decentralized blockchain network, instructions for the decentralized consensus network to compute the subsequent state of the decentralized blockchain network based on (i) the previous state of the decentralized blockchain network and (ii) the one or more commitments recorded as the one or more blocks of the decentralized blockchain network;
   receive a first Merkle tree root hash from the decentralized consensus network;
   receive a series of Merkle tree leaves associated with a Merkle tree and a plurality of hashes corresponding to complementary branches of the Merkle tree associated with a root to leaf path for each of the series of Merkle tree leaves from an implementation keeper;
   compute, for each of the series of Merkle tree leaves using the plurality of hashes, a second Merkle tree root hash;
   for each of the series of Merkle tree leaves, using the plurality of hashes, determine that the second Merkle tree root hash matches the first Merkle tree root hash; and
   execute instructions contained within each of the Merkle tree leaves to evolve the state of the decentralized blockchain network from the previous state to the subsequent state;
   the initiation keeper configured to:
   monitor the decentralized processing system; and
   detect when the recorded one or more blocks of blockchain exceed a threshold number of blocks;
   the decentralized consensus network configured to:
   compute a subsequent state of the decentralized blockchain network based on (i) the previous state and (ii) the one or more commitments recorded as the one or more blocks of the decentralized blockchain network;
   record a state file associated with the subsequent state to a remote storage platform;
   compute the Merkle tree associated with the subsequent state;
   determine the first Merkle tree root hash associated with the Merkle tree; and
   transmit the first Merkle tree root hash to the decentralized blockchain network;
   a remote storage platform configured to:
   receive, from the decentralized consensus network, the state file; and
   store the state file;
   an implementation keeper configured to:
   compute the Merkle tree based on the state file and the zero or more cryptographic commitments; and
   transmit, to the decentralized blockchain network, a series of Merkle tree leaves associated with the Merkle tree and the plurality of hashes of the Merkle tree.

2. A decentralized processing system comprising:

one or more processors;

one or more non-transitory memories in communication with the one or more processors storing instructions thereon that when executed by the one or more processors are configured to cause the decentralized processing system to:

identify zero or more cryptographic commitments to evolve a state of a blockchain from a previous state to a subsequent state recorded in one or more blocks of the blockchain;

receive an indication to update the state of the blockchain from the previous state to the subsequent state;

in response to the indication, transmit, to a decentralized consensus network remote from the decentralized processing system, instructions for the decentralized consensus network to compute a subsequent state based on (i) the previous state and (ii) commitments recorded in one or more blocks of the blockchain;

receive, from the decentralized consensus network, a first cryptographic hash associated with a data structure, the first cryptographic hash determined by the decentralized consensus network based on the computed subsequent state;

receive, from an implementation keeper a series of data entries associated with the data structure and one or more complementary hashes for each data entry of the series of data entries;

compute, for each of the series of data entries, a second cryptographic hash;

for each of the series of data entries, determine that the second cryptographic hash matches the first cryptographic hash; and execute instructions contained within the series of data entries to evolve the state of the blockchain from the previous state to the subsequent state.

3. The decentralized processing system of claim 2, wherein:

the data structure comprises a Merkle tree;

the first cryptographic hash comprises a first Merkle tree root hash;

each of the computed second cryptographic hashes comprise a second Merkle tree root hash;

the series of data entries comprise a series of Merkle tree leaves associated with the Merkle tree; and the one or more complementary hashes for each data entry of the series of data entries comprise one or more complementary hashes of the Merkle tree for each Merkle tree leaf of the series of Merkle tree leaves.

4. The decentralized processing system of claim 2, wherein the one or more non-transitory memories store further instructions, that when executed by the one or more processors, are configured to cause the system to:

determine whether the first cryptographic hash has previously been implemented to evolve the state of the blockchain;

in response to the first cryptographic hash having previously been implemented, do not evolve the previous state to the subsequent state.

5. The decentralized processing system of claim 2, wherein the one or more non-transitory memories store further instructions, that when executed by the one or more processors, are configured to cause the system to:

determine, for each data entry of the series of data entries, whether a respective data entry has previously been implemented to evolve the state of the blockchain;

reject the respective data entry responsive to determining that a respective Merkle tree leaf has been previously implemented.

6. The decentralized processing system of claim 2, wherein the data structure is selected from a Merkle tree, a Verkle tree, a Patricia Trie, and a Merkle Patricia Trie.

7. The decentralized processing system of claim 2, wherein the non-transitory memory includes further instructions, that when executed by the one or more processors, are configured to cause the system to store a cryptographic hash associated with program instructions executed by the decentralized consensus network.

8. The decentralized processing system of claim 2, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

9. The decentralized processing system of claim 2, wherein the decentralized consensus network comprises the implementation keeper.

10. The decentralized processing system of claim 3, wherein the series of Merkle tree leaves comprise data for work units to be carried out by the decentralized processing system to evolve the previous state to the subsequent state.

11. The decentralized processing system of claim 3, wherein at least one Merkle tree leaf of the series of Merkle tree leaves comprises a cryptographic hash associated with the subsequent state.

12. The decentralized processing system of claim 3, wherein one or more Merkle tree leaves of the series of Merkle tree leaves comprise instructions to evolve the state of the blockchain from the previous state to the subsequent state.

13. The decentralized processing system of claim 3, wherein the indication comprises the recorded one or more blocks exceeding a threshold number of blocks.

14. The decentralized processing system of claim 3, wherein the indication comprises a timestamp associated with the recorded one or more blocks exceeding a threshold value.

15. A decentralized processing system comprising:

one or more processors;

one or more non-transitory memories in communication with the one or more processors storing instructions thereon that when executed by the one or more processors are configured to cause the system to:

identify zero or more cryptographic commitments to evolve a state of a blockchain from a previous state to a subsequent state recorded in one or more blocks of the blockchain;

receive an indication to update the state of the blockchain from the previous state to the subsequent state;

in response to the indication, transmit, to a decentralized consensus network remote from the decentralized processing system, instructions for the decentralized consensus network to compute the subsequent state based on (i) the previous state and (ii) commitments recorded in one or more blocks of the blockchain;

receive, from the decentralized consensus network, a first Merkle tree root hash associated with a Merkle tree, the first Merkle tree root hash determined by the decentralized consensus network based on the computed subsequent state;

receive, from an implementation keeper a series of Merkle tree leaves associated with the Merkle tree and a plurality of hashes corresponding to complementary branches of the Merkle tree associated with a root to leaf path for each of the series of Merkle tree leaves from an implementation keeper;

compute, for each of the series of Merkle tree leaves using the plurality of hashes, a second Merkle tree root hash;

for each of the series of Merkle tree leaves, using the plurality of hashes, determine that the second Merkle tree root hash matches the first Merkle tree root hash; and execute instructions contained within each of the Merkle tree leaves to evolve the state of the blockchain from the previous state to the subsequent state.

16. The decentralized processing system of claim 15, wherein the one or more non-transitory memories store further instructions, that when executed by the one or more processors, are configured to cause the system to:

determine whether the first Merkle tree root hash has previously been implemented to evolve the state of the blockchain;

in response to the first Merkle tree root hash having previously been implemented, do not evolve the previous state to the subsequent state.

17. The decentralized processing system of claim 15, wherein the one or more non-transitory memories store further instructions, that when executed by the one or more processors, are configured to cause the system to:

determine, for each of the series of Merkle tree leaves, whether a respective Merkle tree leaf has previously been implemented to evolve the state of the blockchain;

reject the respective Merkle tree leaf responsive to determining that the respective Merkle tree leaf has been previously implemented.

18. The decentralized processing system of claim 15, wherein the non-transitory memory includes further instructions, that when executed by the one or more processors, are configured to cause the system to reject evolving the state of the blockchain based on not implementing the zero or more cryptographic commitments in response to determining that the decentralized consensus network is unavailable.

19. The decentralized processing system of claim 15, wherein the indication is selected from the recorded one or more blocks exceeding a threshold number of blocks and a timestamp associated with the recorded one or more blocks exceeding a threshold value.

20. The decentralized processing system of claim 15, wherein the plurality of hashes correspond to complementary branches of the Merkle tree associated with a root to leaf path for each of the series of Merkle tree leaves.

* * * * *